June 16, 1936.  L. VAUGHAN, JR  2,044,411
DEVICE FOR MEASURING STIFFNESS OF SHEET MATERIAL
Filed Feb. 17, 1936
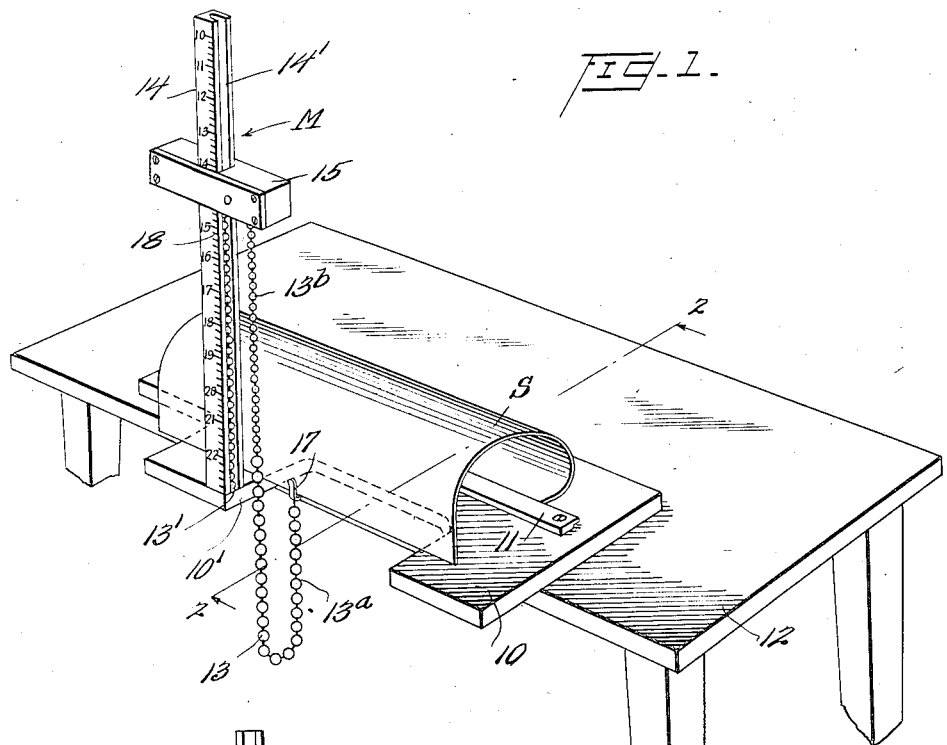

Patented June 16, 1936

2,044,411

UNITED STATES PATENT OFFICE 2,044,411

DEVICE FOR MEASURING STIFFNESS OF SHEET MATERIAL

Leonce Vaughan, Jr., Hartsville, S. C.

Application February 17, 1936, Serial No. 64,402

5 Claims. (Cl. 73—51)

The present invention relates to apparatus for the measurement of the stiffness of sheets of paper, cardboard, or other flexible material in sheet form.

It is frequently necessary or desirable to ascertain within rather precise limits the stiffness of sheet material, particularly the stiffness of paper, cardboard or corrugating board or paper of the type which is ultimately fabricated into shipping containers, since the relative stiffness of the paper in sheet form determines the relative stiffness of the carton, container, or other article fabricated therefrom. Thus it is essential in selecting a material to be used in the fabrication of a container of a certain size and to be used for a certain purpose, to choose a material having a certain minimum stiffness in order that the resultant carton may have the rigidity required to enable it to function in the desired manner. The stiffness of a sheet of paper or the like may be determined by ascertaining its resistance to bending or flexure, a sheet which offers little resistance to bending being said to have little stiffness and a sheet which offers greater resistance to bending being said to have a greater stiffness. In testing the stiffness of a sheet of a particular type or grade of material it is highly desirable that the bending forces be so applied that the sheet, in flexing, will be quite free to assume its natural curvature since if its free flexure be interfered with or prevented a greater force will be required to accomplish the same degree of flexure than would otherwise be necessary, thus destroying the accuracy of the test.

Generally the stiffness test is made by firmly securing a square or rectangular sheet along one margin in a fixed plane and flexing the remainder of the sheet about the secured portion into a generally semi-cylindrical shape by the application of measured forces to the free margin of the sheet, the force necessary to bring the free margin of the sheet into a predetermined position indicating the stiffness thereof. In accordance with the present invention an apparatus for the accurate measurement of the forces necessary to so flex any given piece of sheet material is provided and by means of which the operator engaged in making tests of this nature is enabled to do so more rapidly and with greater accuracy than has heretofore been found possible.

The apparatus contemplates the provision of means for loading the free margin of a sheet, which is secured along its opposite parallel margin, by means of a weighting chain, one end of the chain being provided with an element by means of which it may be readily attached to or detached from the sheet, and mechanism being associated with the chain for rapidly adding to or subtracting from, under the close control of the operator, that portion or part of the chain which is actually supported by the free edge of the sheet undergoing test. By the manipulation of this mechanism the weight necessary to bring the free margin of the sheet undergoing test into a predetermined position may be added to the free margin thereof as rapidly as may be desired, and the exact weight so added may be instantly known to the operator at any time, a scale graduated in weight units forming a part of the apparatus for this purpose.

The chain weight, depending freely from the free margin of the sheet under test, is suspended in space and offers no resistance to horizontal movement of the free margin of the sheet. Weight may be added to the free margin of the sheet under test as rapidly as the operator desires by the simple manipulation of the apparatus, and this is an important advantage of the invention since certain types of sheet material will speedily become permanently distorted, or take permanent sets within relatively short periods of time after a substantial flexure has occurred. For instance, certain types of paper sheets will, when flexed into substantially semi-cylindrical form, take permanent sets within a relatively few seconds and, after this has occurred, the accuracy of the test is destroyed.

In carrying my invention into practice, and for the testing of sheet materials of different types, various forms of testing apparatus may be designed and constructed in accordance with the invention. By way of example one embodiment of the apparatus, which has proven to be eminently successful in practice, will be described in detail, this form being illustrated in the accompanying drawing, in which:

Figure 1 is a perspective view of the apparatus; and

Figure 2 is a section on line 2—2 of Figure 1.

The apparatus illustrated comprises a base 10, sheet margin retaining or holding means 11 and weight applying mechanism generally indicated at M. A sheet of material undergoing test is indicated at S, this sheet being shown in the position in which it occupies at the conclusion of the flexing or bending operation.

The base itself may have various forms but that illustrated in the drawing is simple, inexpensive, and may be used with great convenience. It is a generally flat member which may be conveniently fabricated of wood and is adapted to be placed upon the flat upper surface of a table, desk or the like, the support shown in the drawing comprising a table 12. While the exact shape of the base 10 may be considerably varied it is preferred that it shall be a generally rectangular member as shown and that it be cut away as at 10' to provide an aperture through which the weighting chain, indicated at 13, may depend. The means for clamping and securing in a definite position one margin of the sheet S is of simple nature, comprising an elongated strip, preferably longer than the margin of the sheet to be tested, having an undercut groove formed on the side thereof which faces away from the weighting mechanism M. A sheet, the margin of which is inserted in this groove and which is then flexed until it has assumed the generally semi-cylindrical position shown in the drawing, will have its margin firmly retained by the strip 11 without the assistance of additional mechanism, although such additional mechanism may be employed if desired, as for instance some sort of a clamping device.

The weighting mechanism M includes the weighting chain 13, the vertically disposed guide member 14, the lower end of which is secured to the base 10, and the slide 15 which is vertically movable along the guide 14 and which carries an anti-friction roller 16 in such manner that the roller may revolve freely. The weighting chain 13 has one end 13' fixed either to the guide 14 or to the base 10 and its other end is provided with an element such as a spring clip, indicated at 17, and by means of which this end of the chain may be readily attached to and detached from the free edge of the sheet S which is to be tested. Guide 14 is provided with a groove 14', and the portion of the chain 13 adjacent the fixed end 13', which lies below the roller 16 over which the chain passes, lies within this groove anad hence is out of the way and may not be struck accidently by an operator during a test and the accuracy thereof disturbed.

If desired, the weighting chain 13 may be formed into two portions, a portion 13a the links or elements of which are preferably uniform in weight, and which portion is the only portion of the chain which at any time depends from and is carried by the free margin of the sheet S, and the portion 13b, which may conveniently be of smaller size and need not be so accurately formed since its only function is to raise and lower as desired the end of the weighting portion 13a of the chain and to thereby increase or decrease the length of that portion of the machine which depends from the margin of the sheet.

Assuming that a sheet such as S is to be tested, it is first placed in a substantially horizontal position and one margin slipped into the undercut groove formed in the retaining strip 11. The remainder of the sheet may be flexed until it occupies substantially the position of the sheet shown in the drawing, with the free margin thereof being downwardly inclined as shown. The edge of this margin of the sheet will be above the upper surface of the base 10, as the sheet will not have been fully flexed. At this point the element 17 is attached to the free margin of the sheet at approximately its midpoint and the operator, by gradually lowering the slide 14, and passing out the weighting chain, will gradually increase the weight tending to draw the lower edge of the sheet into contact with the base 10. The weight thus applied may be increased as rapidly as desired, having due regard to the necessity for determining the exact amount of weight which must be added to just bring the free edge of the sheet into contact with the base 10.

When contact has been established, the movement of the slide is instantly halted and, by regarding the scale 18 inscribed upon the guide or standard 14, and which may be graduated in units of weight, the operator may immediately perceive just how much weight has been applied to the lower margin of the sheet under test by means of the chain. One edge of the slide 15 will be made use of as an indicator or a special indicator employed. Any suitable friction element may be employed to cause the slide 15 to remain in any position to which it may be adjusted or, alternatively, some more positive clamping means may be utilized. By passing the chain 13 over the pulley or anti-friction wheel 16, and securing the end of the chain at the point 13', a multiplication factor is realized, the result of such an arrangement being that for a given movement of the slide vertically of the guide 14 an equal length of weighting chain is caused to be added to or subtracted from that portion which depends from the edge of the sheet. It will be appreciated that if the upper end of the chain were connected directly to the slide instead of being passed over the anti-friction roller that the slide would then be necessarily raised, say, two inches to shorten the weight applying part of the chain one inch and hence the standard 14 would have to be very considerably lengthened to permit the same range of weight additions. It is highly desirable that the range of vertical movement of slide 15 be kept relatively short for the convenience of the operator and the apparatus illustrated has, in this respect, proven itself to be highly advantageous.

In the usual case the sheet under test will be deflected into semi-cylindrical form at the conclusion of a test as has been described. This is not necessarily so, however, as a sheet may be tested by deflecting it to a greater or lesser extent. The word semi-cylinder as used in the specification and claims is therefore not a word of limitation. Where the sheet is to be deflected through a different angle of curvature changes in the relative positions of the weight applying mechanism and the margin retaining means may be readily made to permit this.

Having thus described the invention, what is claimed as new and desired to be secured by Letters Patent is:

1. Apparatus for the measurement of the stiffness of a sheet of paper or the like by the application of measured bending forces thereto comprising means for engaging one margin of such a sheet and maintaining the same in fixed position while the remainder thereof is flexed into approximately the form of a semi-cylinder with downturned free margin, and mechanism for weighting the said free margin of such sheet, when so disposed, to further downwardly deflect the same while permitting free horizontal movement of such margin and free curvature of the sheet, said mechanism including a weighting chain having an element at one end for attaching the same to the depending margin of such a sheet and means engaging the chain at a point spaced from said element for varying at will the length of that portion of the chain which is supported by the free margin of the sheet.

2. The combination set forth in claim 1 in which the margin engaging means and said mechanism are both mounted upon a common flat base, said base being cut away adjacent said mechanism to permit passage of the chain and also having portions to intercept the free margin of a sheet and limit the downward movement thereof.

3. Apparatus for the measurement of the stiffness of a sheet of paper or the like by the application of measured bending forces thereto comprising means for engaging one margin of such a sheet and maintaining the same in fixed position while the remainder thereof is flexed into approximately the form of a semi-cylinder with downturned free margin, and mechanism for weighting the said free margin of such sheet, when so disposed, to further downwardly deflect the same while permitting free horizontal movement of such margin and free curvature of sheet, said mechanism including a weighting chain having one end fixed and an element at the other end for attaching the same to the depending margin of such a sheet, and a vertically movable member engaging the chain intermediate its fixed end and said element for varying at will the length of that portion of the chain which is supported by the free margin of the sheet.

4. Apparatus for the measurement of the stiffness of a sheet of paper or the like by the application of measured bending forces thereto comprising means for engaging one margin of such a sheet and maintaining the same in fixed position while the remainder thereof is flexed into approximately the form of a semi-cylinder with downturned free margin, and mechanism for weighting the said free margin of such sheet, when so disposed, to further downwardly deflect the same while permitting free horizontal movement of such margin and free curvature of the sheet, said mechanism including a weighting chain having one end fixed and an element at the other end for attaching the same to the depending margin of such a sheet, and an anti-friction roller mounted for vertical movement, said roller engaging the chain intermediate its fixed end and said element and varying, when moved vertically, the length of that portion of the chain which is supported by the free margin of the sheet.

5. The combination set forth in claim 4 in which said roller is mounted upon a slide, which slide is in turn mounted upon a vertically disposed guide, the guide being provided with graduations by which the position of the slide, and hence the weight of that portion of the chain supported by the free margin of the sheet, may be determined.

LEONCE VAUGHAN, Jr.